US011543737B2

(12) United States Patent
Schenker et al.

(10) Patent No.: US 11,543,737 B2
(45) Date of Patent: Jan. 3, 2023

(54) MIRROR ASSEMBLY WITH CLAMP FOR HOLDING COMMUNICATION DEVICE

(71) Applicant: Advantus, Corp., Jacksonville, FL (US)

(72) Inventors: David A. Schenker, Cedarburg, WI (US); Chris Pitzo, Pewaukee, WI (US)

(73) Assignee: Advantus, Corp., Jacksonville, FL (US)

( * ) Notice: Subject to any disclaimer, the term of this patent is extended or adjusted under 35 U.S.C. 154(b) by 527 days.

(21) Appl. No.: 16/718,455

(22) Filed: Dec. 18, 2019

(65) Prior Publication Data

US 2021/0191063 A1 Jun. 24, 2021

(51) Int. Cl.
*G02B 7/182* (2021.01)
*A45D 42/18* (2006.01)
*G03B 17/56* (2021.01)

(52) U.S. Cl.
CPC ........... *G03B 17/561* (2013.01); *A45D 42/18* (2013.01); *G02B 7/182* (2013.01)

(58) Field of Classification Search
CPC ......... G03B 21/30; G02B 7/182; A45D 42/18
See application file for complete search history.

(56) References Cited

U.S. PATENT DOCUMENTS

| 9,170,473 | B1 | 10/2015 | Li | |
|---|---|---|---|---|
| 9,648,217 | B2 | 5/2017 | Kaiser | |
| 9,797,592 | B2 | 10/2017 | Marcus et al. | |
| 9,851,625 | B1 | 12/2017 | Fernandez | |
| 10,076,176 | B2 | 9/2018 | Yang et al. | |
| 2007/0012840 | A1* | 1/2007 | Kalis | F16M 13/022 248/481 |
| 2013/0233986 | A1 | 9/2013 | Rasheta | |
| 2018/0172262 | A1 | 6/2018 | Garcia | |
| 2018/0270410 | A1 | 9/2018 | Lyle et al. | |
| 2021/0016721 | A1* | 1/2021 | Shin | B60R 11/0241 |

* cited by examiner

*Primary Examiner* — Ryan D Howard
(74) *Attorney, Agent, or Firm* — Andrus Intellectual Property Law, LLP

(57) ABSTRACT

A mirror assembly is configured to hold a communication device and has a mirror with a back panel and an opposite reflective front surface. The reflective front surface vertically extends between a top surface and an opposite bottom surface. An arm is coupled to the back panel and has a first end vertically above the top surface of the mirror. A clamp is coupled to the first end of the arm and configured to hold the communication device vertically above the top surface of the mirror such that the reflective front surface is unobstructed by the arm and the communication device.

19 Claims, 5 Drawing Sheets

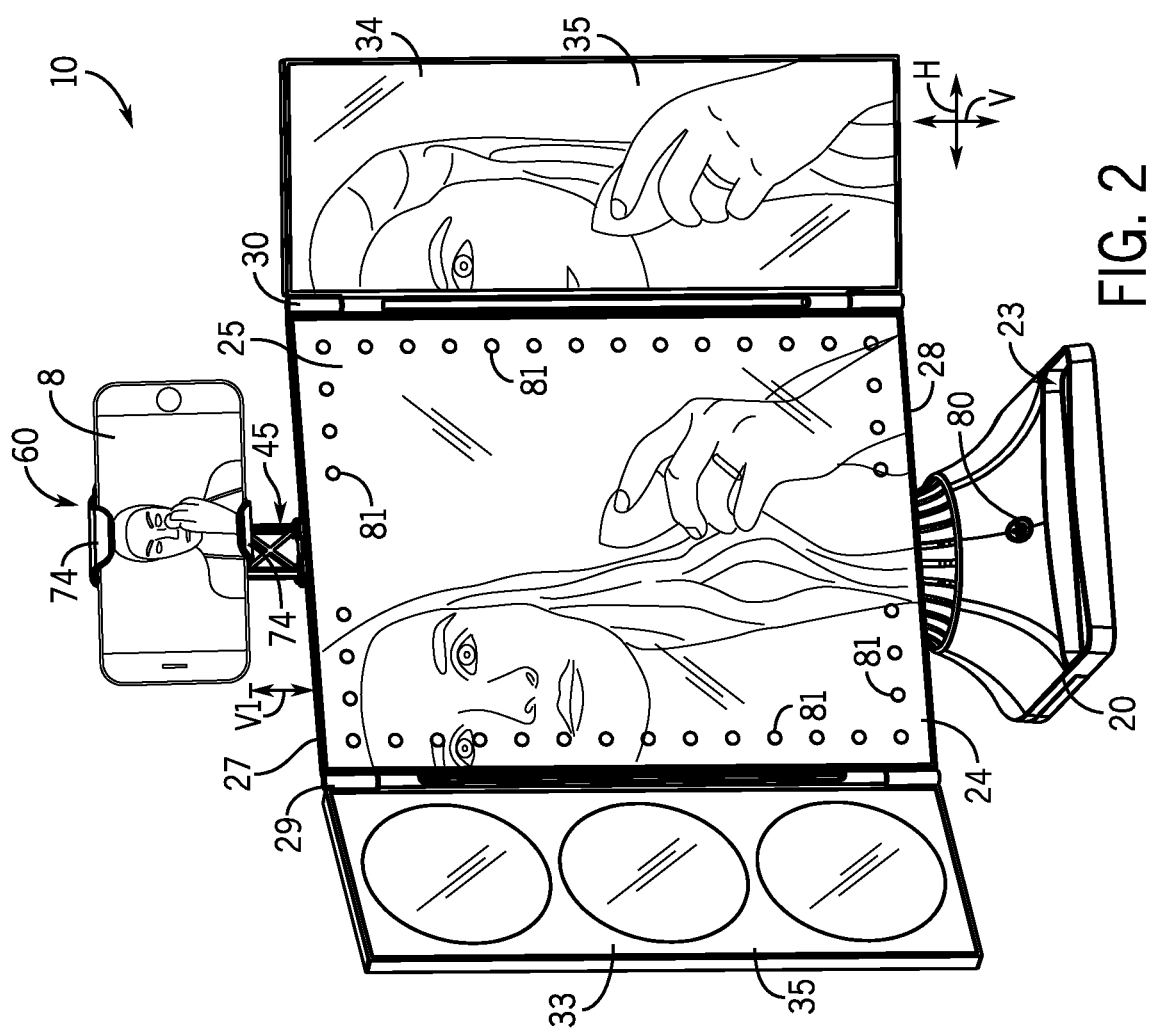
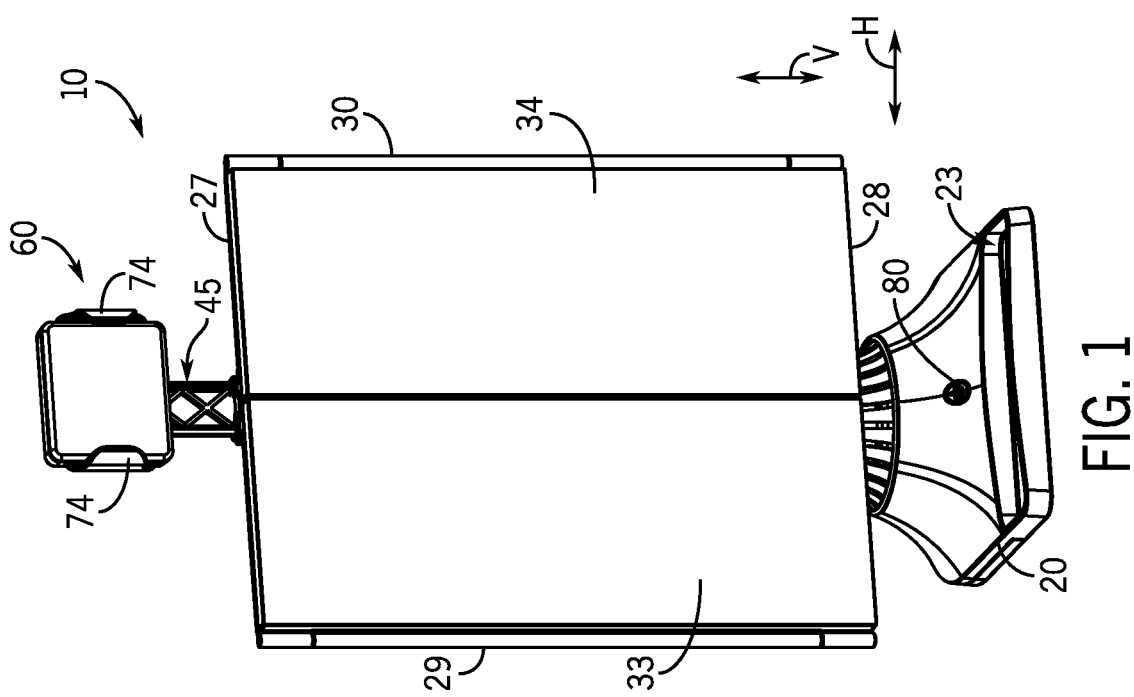

MIRROR ASSEMBLY WITH CLAMP FOR HOLDING COMMUNICATION DEVICE

FIELD

The present disclosure relates to a mirror assembly, and specifically to a mirror assembly with a mirror and a clamp for holding a communication device.

BACKGROUND

The rapid advancement of communication devices, such as cell phone and tablets, and internet platforms on which videos and pictures can be uploaded and shared has increased in recent years. Accordingly, numerous tutorial videos are available to help viewers perform various daily tasks such as auto repair, yard work, and personal makeup application. With regards to personal makeup application tutorial videos, a viewer may desire to watch the these videos while simultaneously looking into a mirror and applying the makeup.

Accordingly, the present inventors have developed the a mirror assembly of the present disclosure that hold a communication device relative to the mirror such that the user can watch the tutorial video and the communication device does not obstruct the user's reflection in the mirror. Furthermore, the present inventors have developed adjustable and moveable components that permit the user to quickly and securely move the communication device relative to the mirror to achieve a desired viewing orientation or angle.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a mirror assembly is configured to hold a communication device and has a mirror with a back panel and an opposite reflective front surface. The reflective front surface vertically extends between a top surface and an opposite bottom surface and horizontally between a first side surface and an opposite second side surface. An arm is coupled to the back panel and has a first end vertically above the top surface of the mirror. A clamp is coupled to the first end of the arm and configured to hold the communication device vertically above the top surface of the mirror such that the reflective front surface is unobstructed by the arm and the communication device.

In certain examples, a mirror assembly is configured to hold a communication device and has mirror with a back panel and an opposite reflective front surface. The reflective front surface vertically extends between a top surface and an opposite bottom surface and horizontally between a first side surface and an opposite second side surface. The back panel defines a pocket. An arm has a first end vertically above the top surface of the mirror and an opposite second end slidably received in the pocket. A clamp is coupled to the first end of the arm and is configured to hold the communication device vertically above the top surface of the mirror such that the reflective front surface is unobstructed by the arm and the communication device. The clamp has opposing clamp arms that are biased toward each other by a spring, and the opposing clamp arms are configured to engage and apply a clamping force to the communication device to thereby hold the communication device in the clamp. The clamp is movable relative to arm to thereby change orientation of the communication device relative to the reflective front surface.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

FIG. 1 is a front perspective view of an example mirror assembly of the present disclosure with secondary mirrors in closed positions.

FIG. 2 is a front perspective of the mirror assembly of FIG. 1 with the secondary mirrors in open positions.

DETAILED DISCLOSURE

Figure 3:
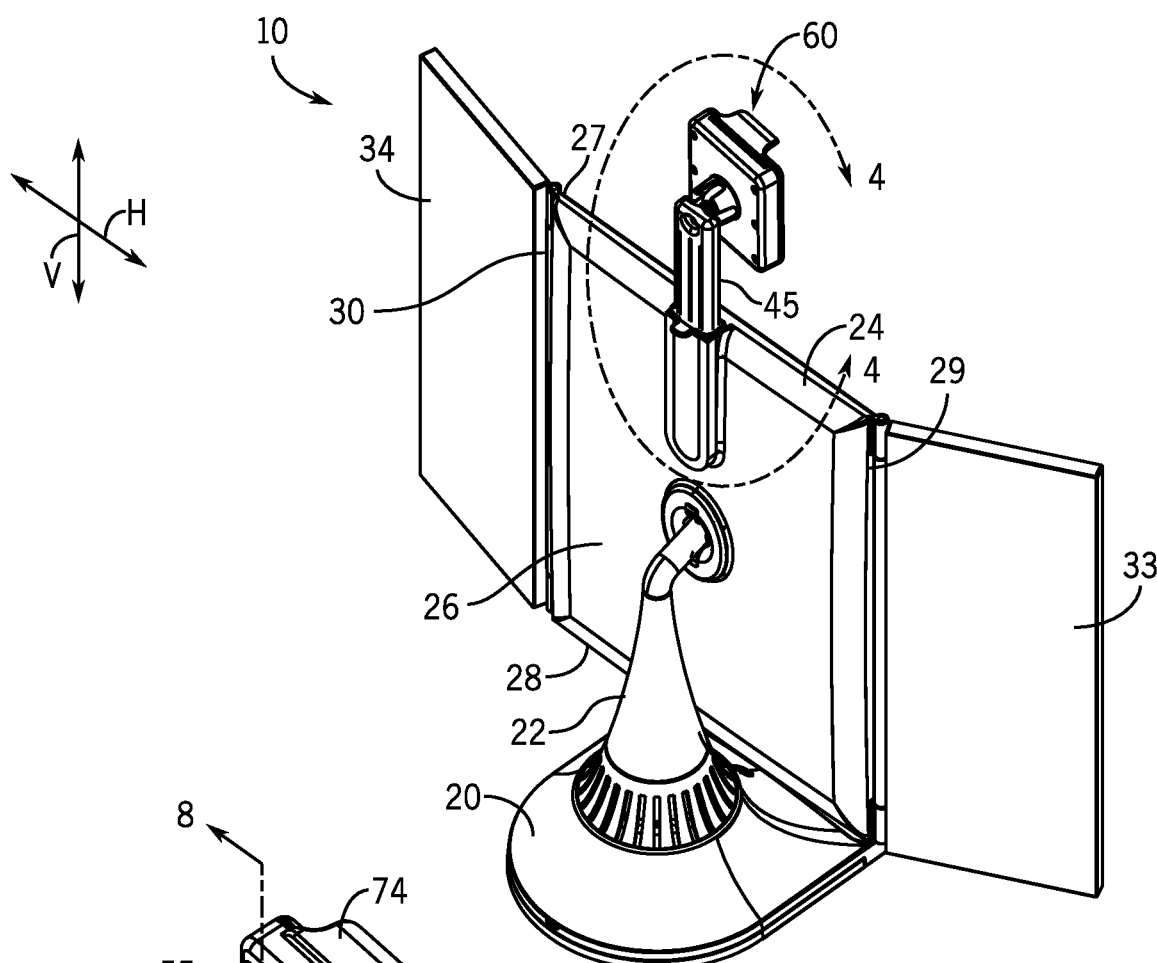
FIG. 3 is a rear perspective of the mirror assembly of FIG. 2.

An example embodiment of a mirror assembly 10 is disclosed herein below, and the assembly 10 depicted in FIGS. 1-9 is a freestanding vanity mirror. However, various features and/or components of the assembly 10 described herein below and depicted in FIGS. 1-9 can be used with other embodiments of the mirror assemblies such as wall-mounted mirrors, mirrors mounted on vehicles, mirrors mounts on furniture, and/or the like Referring to FIGS. 1-3, the mirror assembly 10 has a base 20 configured to contact a horizontal surface (not shown; e.g., a desk, a table). The base 20 has a stem 22 connected to a main mirror 24 that has a reflective front surface 25 (FIG. 2; described herein) that reflects the user's reflection. In one example, the stem 22 is connected to a back panel 26 (FIG. 3) of the main mirror 24 that is opposite the reflective front surface 25 (FIG. 2). The connection between the stem 22 and back panel 26 can vary. For instance, the stem 22 is connected to the back panel 26 with a ball-and-socket joint such that the main mirror 24 is moveable relative to the stem 22 (as depicted in FIG. 3). In other examples, the stem 22 is connected to the back panel 26 with a hinge (not shown) such that the main mirror 24 are moveable relative to the stem 22. In still other examples, the stem 22 is connected to the back panel 26 with mechanical fasteners such as nuts and bolts or screws. The base 20 has a tray 23 in which loose items such, as lipstick or makeup applicators, can be placed.

The reflective front surface 25 extends vertically (see vertical direction arrow V) between a top surface 27 and an opposite bottom surface 28 and a horizontally (see horizontal direction arrow H) between a first side surface 29 and an opposite second side surface 30. As such, the reflective front surface 25 in the example depicted in FIG. 2 is a planar and rectangular surface. Note that in other example assemblies 10 the shape of the reflective front surface 25 may vary (e.g., oval, circular, square). Also, note that in FIGS. 1-3 the top surface 27, the bottom surface 28, and the side surfaces 29, 30 are integral with the back panel 26. The back panel 26 and the surfaces 27, 28, 29, 30 are formed with any suitable material such as wood, plastic, or metal. In other examples, the reflective front surface 25 is part of a layered plate-glass mirror that has a thin metallic layer and a relatively thicker glass panel such that the one or more of the top surface 27, the bottom surface 28, and/or the side surfaces 29, 30 are defined by the thickness of the glass panel.

The assembly 10 optionally includes one more secondary mirrors 33, 34 which are hingedly connected to the main mirror 24. Specifically, the first secondary mirror 33 is connected to the first side surface 29 with a hinge (not shown) and a second secondary mirror 34 is connected to the second side surface 30 with a hinge (not shown). Accordingly, the secondary mirrors 33, 34 are moveable relative to the main mirror 24. FIG. 1 depicts the secondary mirrors 33, 34 in closed positions such that front surfaces 35 of the secondary mirrors 33, 34 face and cover the reflective front surface 25 of the main mirror 24. FIGS. 2-3 depict the secondary mirrors 33, 34 in open positions such that the front surfaces 35 of the secondary mirrors 33, 34 face the user of the assembly 10. A person of ordinary skill in the art will recognize that the user may move the secondary mirrors 33, 34 to any position between the closed positions (FIG. 1) and the open positions (FIGS. 2-3) to view their reflection. For example, the secondary mirrors 33, 34 may be angled relative to each other and/or the main mirror 24 to any suitable angle (e.g., the first secondary mirror 33 is angled 90.0 degrees relative to the main mirror 24, the second secondary mirror 34 is angled 120.0 degrees relative to the main mirror 24). The front surfaces 35 of the secondary mirrors 33, 34 may include any number of reflective surfaces 36A-D and the magnification levels of the reflective surfaces 36A-D can vary (e.g., reflective surface 36A has magnification of ×2.0 power, reflective surface 36B has magnification of ×10.0 power). In other examples, the front surfaces 35 include a video screen. In still other examples, the front surfaces 35 include tack boards.

Figure 4:
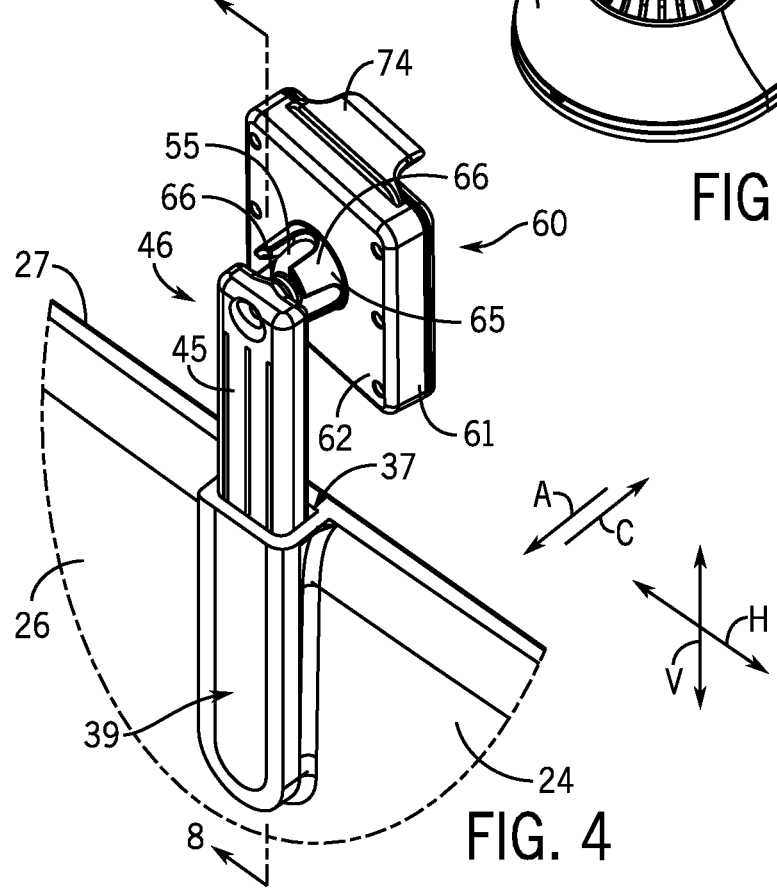
FIG. 4 is an enlarged view of the mirror assembly within line 4-4 of FIG. 3.
Figure 5:
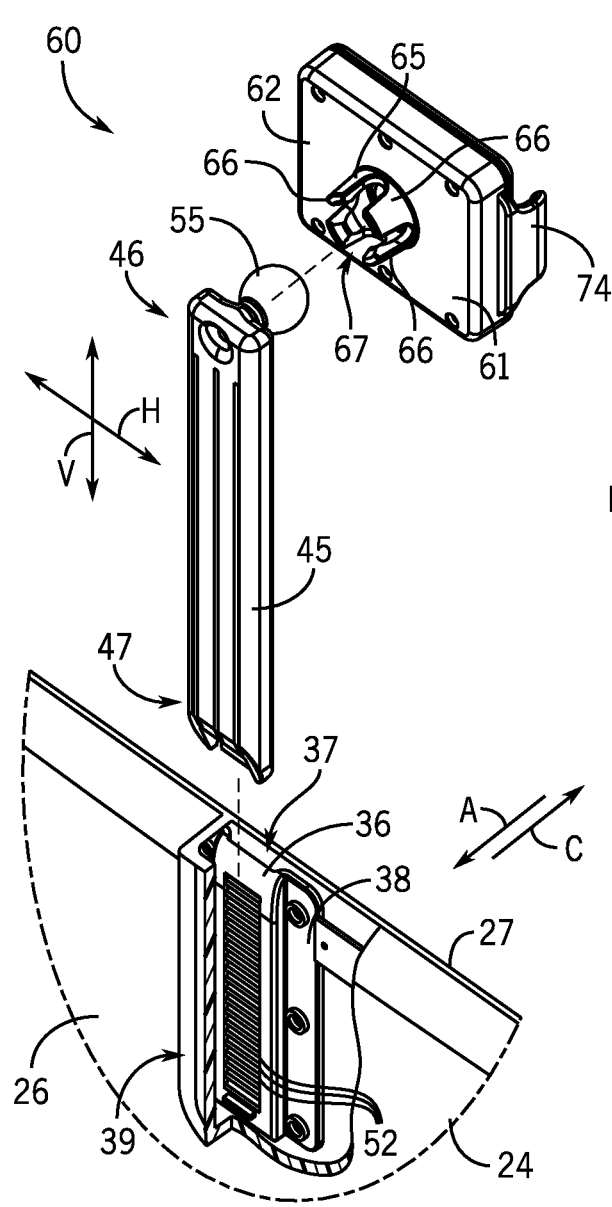
FIG. 5 is an exploded view of the mirror assembly depicted in FIG. 4. Note that a back panel of the mirror assembly is partially removed.

Referring now to FIGS. 4-5, the assembly 10 includes an arm 45 movably coupled to the back panel 26 of the main mirror 24. The arm 45 has a first end 46 vertically extending above the top surface 27. The arm 45 can be vertically moved such that the first end 46 is moved into different vertical positions relative to the top surface 27 (described herein below). The first end 46 of the arm 45 has a ball 55 coupled thereto (described further herein) that extends in a direction toward the reflective front surface 25 (see direction arrow C).

The arm 45 has a second end 47 opposite the first end 46 slidably received in a pocket 37 defined by the back panel 26 and internal framing 38 of the main mirror 24. In this example, the back panel 26 includes a budged portion 39 that extends in a direction away from the reflective front surface 25 (see direction arrow A on FIG. 8). As such, the pocket 37 is defined by the budged portion 39 of the back panel 26 and the internal framing 38. The shape of the pocket 37 corresponds to the shape of the arm 45.

Figure 8:
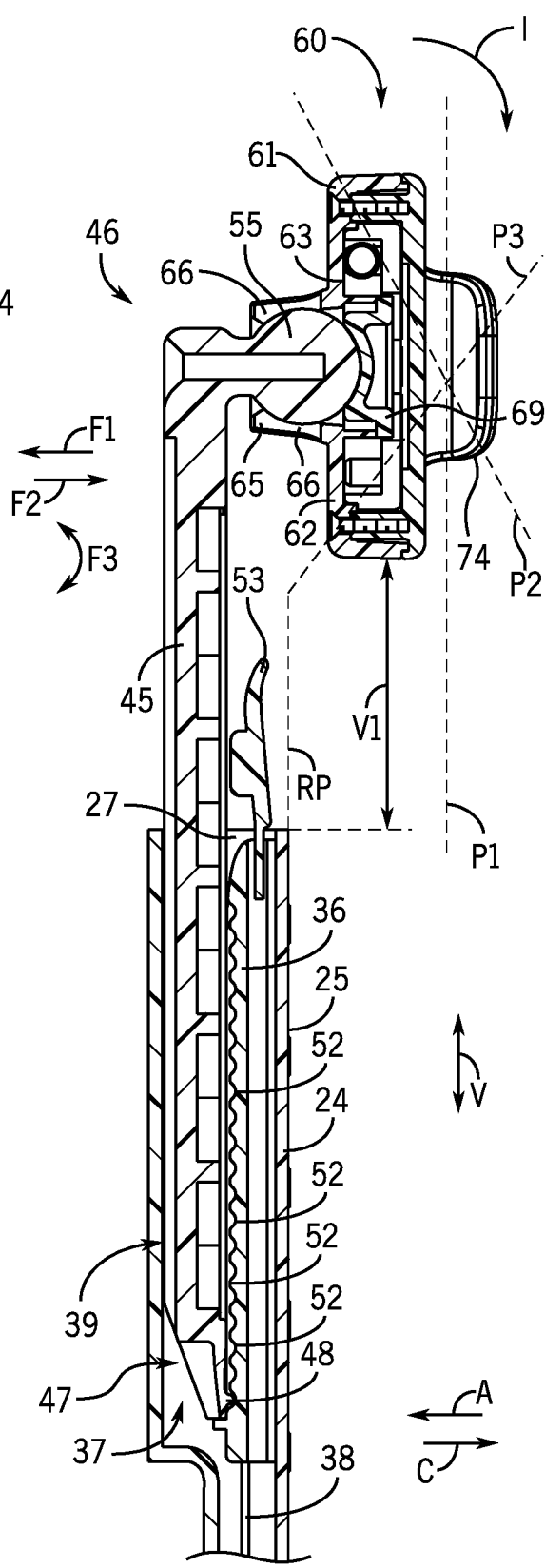
FIG. 8 is a cross-sectional view of the mirror assembly along line 8-8 of FIG. 4.

The main mirror 24 has a ribbed or grooved member 36 with a plurality of horizontal grooves 52 positioned in the pocket 37 (FIGS. 5 and 8). That is, the grooved member 36 is connected to the internal framing 38 such that grooved member 36 is in the pocket 37 and the plurality of grooves 52 face the back panel 26 (see direction arrow A on FIG. 8). The arm 45 has a tooth 48 at the second end 47 that engages and/or is received into one of the grooves 52 such that the arm 45 is vertically restrained in a selected vertical position. That is, as the user vertically pushes or pulls the arm 45 (see direction arrow V) the tooth 48 moves into different grooves 52. When the user releases the arm 45 (e.g., the user stops vertically pulling or pushing the arm 45), the tooth 48 nests or is received in one of the grooves 52 such that the contact between the tooth 48 and the grooved member 36 prevents the arm 45 from inadvertently vertically moving due to force of gravity acting of the arm 45. In certain examples, the tooth 48 and/or the grooved member 36 are made of elastic materials such that one or both of the tooth 48 and the grooved member 36 (e.g., ribs of the grooved member 36) elastically deform as the arm 45 is vertically moved by the user. In certain examples, the second end 47 is tapered to facilitate insertion into the pocket 37. In certain examples, a cover 53 (FIG. 8) is provided to close the pocket 37 and prevent dust or debris from entering the pocket 37 when the arm 45 is completely removed from the pocket 37.

The assembly 10 has a clamp 60 connected to the first end 46 of the arm 45, and the clamp 60 is configured to hold a communication device 8, such as a cell phone or video camera (see FIG. 1-2). In particular, the clamp 60 holds the communication device 8 vertically above the top surface 27 of the main mirror 24 such that the communication device 8 does not obstruct or block the user's reflection reflected by the reflective front surface 25 (e.g., the reflective front surface is unobstructed by the communication device 8 and the clamp 60). FIG. 1 depicts the communication device 8 and the clamp 60 a first vertical distance V1 (see FIGS. 1 and 8) above the top surface 27. Thus, the user can see their reflection in the main mirror 24 while watching a makeup tutorial video on the communication device 8 and/or filming a makeup tutorial video using a camera of the communication device 8. Furthermore, the arm 45 also does not obstruct or block the user's reflection reflected by the reflective front surface 25. Note that the user can change the vertical position of the communication device 8 and the clamp 60 such that the vertical distance V1 changes.

The clamp 60 can be connected to the first end 46 of the arm 45 with any suitable device such as mechanical fasteners, hinges, or the like. In the example depicted in FIGS. 4-5, the clamp 60 is connected to the ball 55 with a socket 65 that securely receives the ball 55. Accordingly, the connection between the first arm 45 and the clamp 60 is akin to a ball-and-socket joint. The socket 65 has a plurality of arms 66 that define a cavity 67 in which the ball 55 is received, and the arms 66 elastically deform as the ball 55 is received into the cavity 67. Once the ball 55 is received in the cavity 67, contact and friction forces between the ball 55 and the inner surfaces of the arms 66 prevent the clamp 60 from inadvertently moving relative the arm 45. Thus, the clamp 60 and the communication device 8 do not inadvertently move. Instead, the user must apply a pushing, pulling, and/or rotational force to the clamp 60 and/or the communication device 8 to thereby move the clamp 60 relative to the arm 45 and the main mirror 24 into any position. Referring to FIG. 8, the clamp 60 faces in a direction away from the main mirror 24 (see direction arrow C). In this position, the communication device 8 (FIG. 1), or a portion thereof (e.g., the front surface of the communication device 8), extends or lies in a first plane P1 that is parallel with the reflective plane RP of the reflective front surface 25. As noted above, when a force, such as pushing force F1, a pulling force F2, and/or a rotational force F3, is applied to the clamp 60 and/or the communication device 8 (FIG. 1), the clamp 60 and the communication device 8 move and the communication device 8 extends or lies in a different plane (see second plane P2 and third plane P3) that is transverse to the reflective plan RP. Thus, the user can adjust the orientation of the communication device 8 relative to the main mirror 24 to achieve the best viewing angle.

Figure 6:
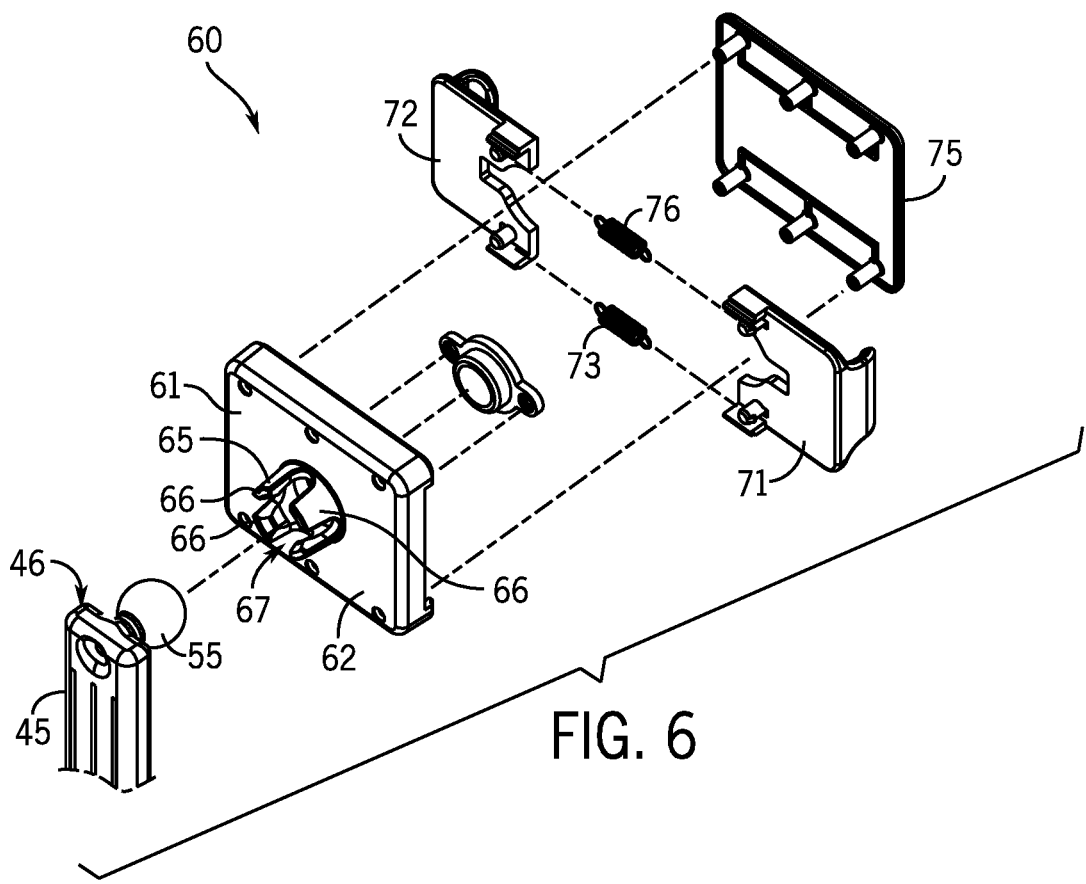
FIG. 6-7 are additional exploded view of the mirror assembly depicted in FIG. 4.
Figure 7:
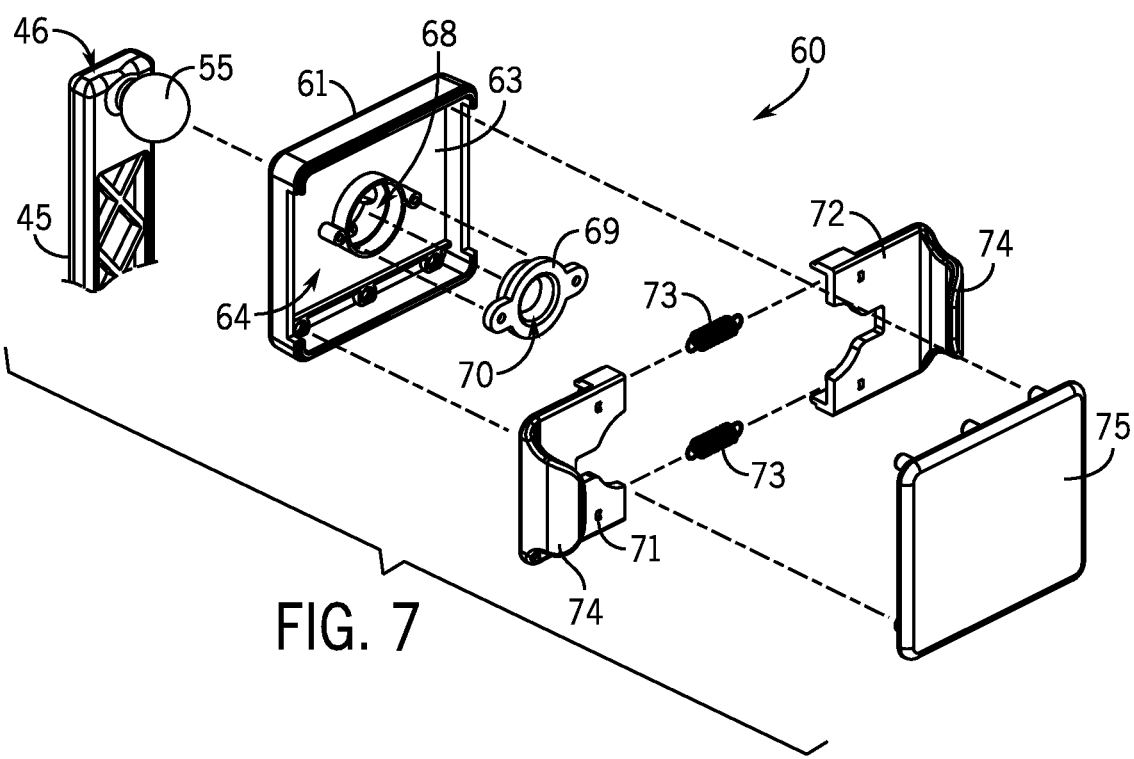

Referring now to FIGS. 6-7, the clamp 60 is depicted in greater detail. The clamp 60 has a housing 61 with a first surface 62 from which socket 65 extends and an opposite second surface 63. The clamp 60 defines a partially enclosed interior space 64 and a hole 68 that extends between the surfaces 62, 63. A retainer 69 is connected to the second surface 63 and in positioned in the interior space 64. The retainer 69 has an opening 70 sized to correspond with the hole 68 in the housing 61. The opening 70 receives a portion of the ball 55 when the ball 55 is received in the cavity 67 defined by the socket 65 and the ball 55 contacts the annular retainer 69 to thereby decrease the likelihood of inadvertent movement of the clamp 60. That is, contact between the annular retainer 69 and the ball 55 produces frictional forces that resist movement of the clamp 60 relative to the ball 55. Thus, the user must apply a force (as noted above) to move the clamp 60 relative the arm 45. In certain examples, the annular retainer 69 is made of an elastic or compressible material.

The clamp 60 includes a pair of arms, namely a first clamp arm 71 and a second clamp arm 72, that are configured to contact and clamp onto the sides of the communication device 8 (see FIG. 1) such that the communication device 8 is held by the clamp 60. The clamp arms 71, 72 are biased toward each other with springs 73, such as coil springs, such that the user must pull the one or both clamp arms 71, 72 away from each other (see direction arrow G on FIG. 9) to thereby position the communication device 8 between the clamp arms 71, 72. When the user releases the clamp arms 71, 72, the springs 73 bias the clamp arms 71, 72 toward each other and compressive forces are applied by the clamp arms 71, 72 on the communication device 8 (see arrow H) to thereby hold the communication device 8 in the clamp 60. The clamp arms 71, 72 include lips 74 to prevent the communication device 8 from falling or rotating out of the clamp 60 (see direction arrow I on FIG. 8) due to force of gravity. Thus, the clamp 60 can hold differently sized communication devices 8.

The clamp 60 also includes a closure plate 75 that connects to the housing 61 and sandwiches the clamping arms 71, 72 in the interior space 64. That is, the clamp arms 71, 72 are sandwiched between the second surface 63 and the closure plate 75. The communication device 8 contacts the closure plate 75 when the communication device 8 is held in the clamp 60. Note that the lips 74 extend out of the interior space 64 and are exposed when the closure plate 75 is connected to the housing 61.

Figure 9:
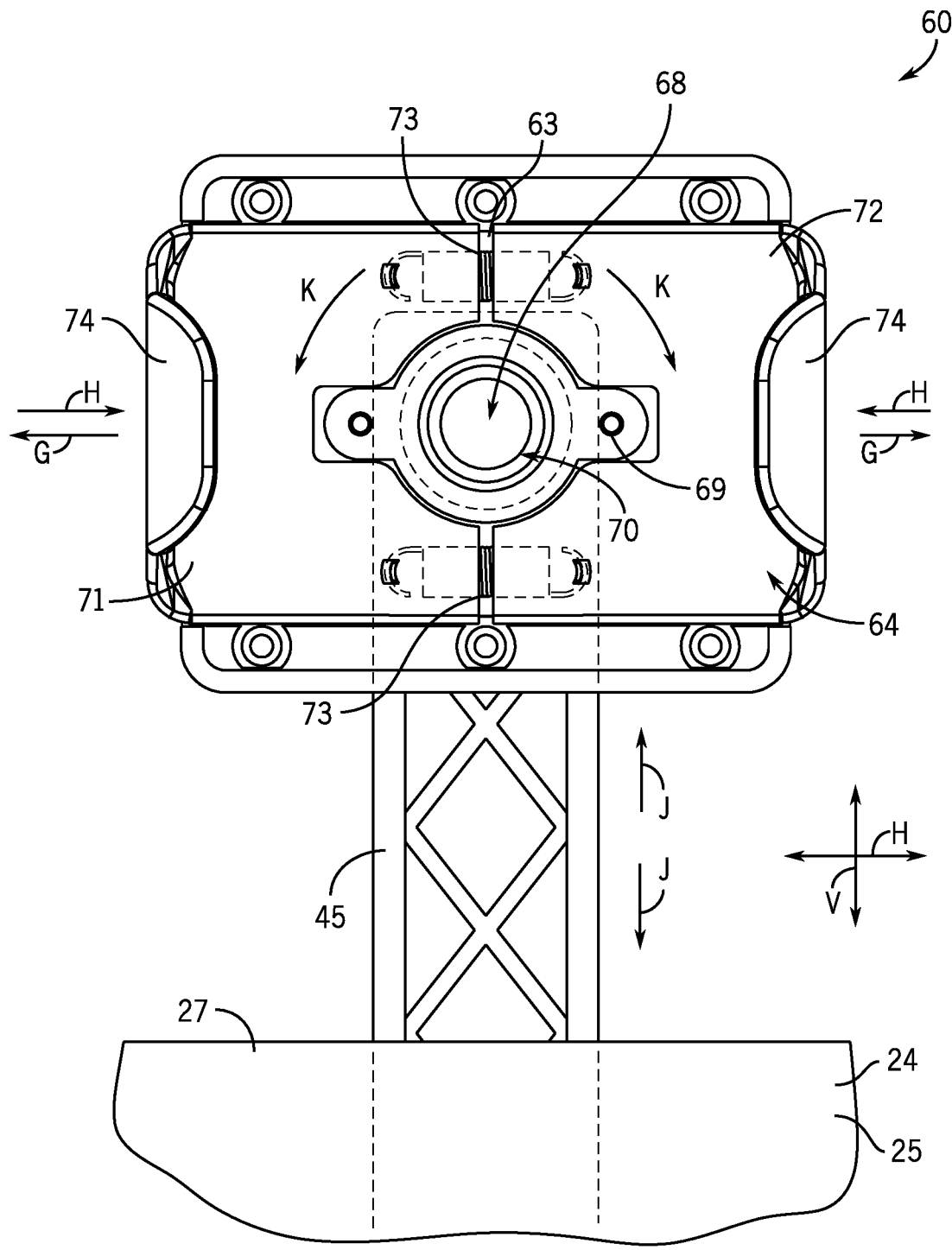
FIG. 9 is an enlarged view of a clamp and arm of the mirror assembly of FIGS. 5-8. The clamp in FIG. 9 excludes a closure plate to thereby expose interior features of the clamp.

FIG. 9 depicts the clamp 60 assembled and on the arm 45. As is mentioned above, the clamp 60 can be vertically moved (see direction arrows J). Furthermore, the clamp 60 can be rotated (see direction arrows K) to thereby adjust the orientation of the communication device 8 relative to the main mirror 24. Furthermore, the clamp 60 can be rotated (see direction arrows K) to thereby place the communication device in a generally horizontal orientation (e.g., "landscape" orientation) or a generally vertical orientation (e.g., "portrait" orientation).

Returning to FIG. 2, the base 20 has a switch 80 (e.g., push button) operably and electrically connected to lights 81 along the perimeter of the main mirror 24. Thus, when the switch 80 is actuated, the lights 81 are turned on or off. In certain examples, the lights 81 are light emitting diodes (LEDs), a light bar, or a light strip. In certain examples, the lights 81 are on the base 20. The switch 80 and the lights 81 are connected via an electrical circuit (not shown). A power source (not shown) is connected to the electrical circuit and provides power to the lights 81. The power source can be disposable batteries, an AC/DC converter that is connected a wall outlet via an electrical plug, a rechargeable battery, or the like. In certain examples, the base 20 has a USB port 82 for connecting to a power source. In certain examples, the base 20 has a USB port 82 such that a USB cord can connect the communication device 8 to the base 20. In this example, the communication device 8 could then be charged and/or controlled by the assembly 10. In other examples, the base 20 has a speaker (not shown), a camera (not shown), and/or microphone (not shown) such that when the communication device 8 is connected to the base 20, via a USB cord, the communication device 8 plays sounds via the speaker, records sounds via the microphone, and/or records video via the camera. Furthermore, in lieu of a USB connection between the communication device 8 and the base 20, the base 20 may have a wireless connection device, such as a Bluetooth receiver, to wirelessly connect the communicationn device 8 devices in the base 20 (e.g., microphone, speaker, camera) and vice versa. Still further, in certain examples, the assembly 10 includes a wireless charging device (not shown) for wirelessly charging the communication device 8 when the communication device 8 is held in the clamp 60.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mirror assembly configured to hold a communication device, the mirror assembly comprising:
   a mirror having a back panel that defines a pocket and an opposite reflective front surface, the reflective front surface vertically extending between a top surface and an opposite bottom surface;
   an arm coupled to the back panel and having a first end vertically above the top surface of the mirror a second end opposite the first end, wherein the second arm is slidably received in the pocket of the back panel; and
   a clamp coupled to the first end of the arm and configured to hold the communication device vertically above the top surface of the mirror such that the reflective front surface is unobstructed by the arm and the communication device, wherein the arm is vertically movable relative to the back panel to thereby change vertical position of the communication device relative to the top surface.

2. The mirror assembly according to claim 1, wherein the communication device is vertically spaced apart from the top surface by a vertical distance.

3. The mirror assembly according to claim 1, wherein the arm extends in a direction toward the front reflective surface such that the communication device is in front of the reflective front surface and the reflective front surface is between the back panels and the communication device.

4. The mirror assembly according to claim 1, wherein the clamp is configured to be movable relative to the arm such that when the communication device is held by the clamp the communication device extends transverse to the reflective front surface.

5. The mirror apparatus according to claim 1, wherein the second end of the arm has a tooth projecting therefrom that engages the mirror and prevents inadvertent vertical movement of the arm.

6. The mirror assembly according claim 5, wherein the pocket is defined between the back panel and the reflective front surface;
wherein the mirror has a grooved member positioned in the pocket, the grooved member has a plurality of grooves defined thereon; and
wherein the tooth is received into one of the grooves in the plurality grooves to thereby prevent inadvertent vertical movement of the arm.

7. The mirror assembly according claim 6, wherein the grooves are horizontally extending grooves.

8. The mirror assembly according to claim 1, wherein the clamp is movable relative to arm to thereby change orientation of the communication device relative to the reflective front surface.

9. The mirror assembly according to claim 8, wherein the clamp is movable such that the communication device extends transverse to the reflective front surface.

10. The mirror assembly according to claim 8, wherein the first end of the arm has a ball and the clamp has a socket that receives the ball.

11. The mirror assembly according to claim 10, wherein the socket has a plurality of arms that elastically deform when the socket receives the ball.

12. The mirror assembly according to claim 11, wherein the plurality of arms contact the ball such that friction between the plurality of arms and the ball prevents inadvertent movement of the clamp relative to the arm.

13. The mirror assembly according to claim 12, wherein the clamp has a retainer that contacts the ball when the socket receives the ball such that friction between the ball and the retainer prevents inadvertent movement of the clamp relative to the arm.

14. The mirror assembly according to claim 9, wherein the clamp has opposing clamp arms that are biased toward each other and configured to contact and apply a clamping force to the communication device.

15. The mirror assembly according to claim 14, wherein the opposing clamp arms are biased toward each other by a spring.

16. The mirror assembly according to claim 15, wherein the spring is connected to each clamp arm.

17. A mirror assembly configured to hold a communication device, the mirror assembly comprising:
a mirror having a back panel and an opposite reflective front surface, wherein the reflective front surface vertically extends between a top surface and an opposite bottom surface, wherein the back panel defines a pocket;
an arm having a first end vertically above the top surface of the mirror and an opposite second end slidably received in the pocket; and
a clamp coupled to the first end of the arm and configured to hold the communication device vertically above the top surface of the mirror such that the reflective front surface is unobstructed by the arm and the communication device, the clamp has opposing clamp arms that are biased toward each other by a spring;
wherein the opposing clamp arms are configured to engage and apply a clamping force to the communication device to thereby hold the communication device in the clamp; and
wherein the clamp is movable relative to arm to thereby change orientation of the communication device relative to the reflective front surface.

18. The mirror assembly according to claim 17, wherein the second end of the arm has a tooth projecting therefrom;
wherein the mirror has a grooved member positioned in the pocket, the grooved member has a plurality of grooves defined thereon; and
wherein the tooth is received into one of the grooves in the plurality grooves to thereby prevent inadvertent vertical movement of the arm.

19. A mirror assembly configured to hold a communication device, the mirror assembly comprising:
a mirror having a back panel and an opposite reflective front surface, wherein the reflective front surface vertically extends between a top surface and an opposite bottom surface, wherein the back panel defines a pocket;
an arm having a first end vertically above the top surface of the mirror and an opposite second end slidably received in the pocket; and
a clamp coupled to the first end of the arm and configured to hold the communication device vertically above the top surface of the mirror such that the reflective front surface is unobstructed by the arm and the communication device,
wherein the arm is vertically movable within the pocket to thereby change a vertical position of the communication device relative to the top surface and the clamp is movable relative to arm to thereby change orientation of the communication device relative to the reflective front surface.

* * * * *